United States Patent [19]

Epperson

[11] Patent Number: 5,247,137
[45] Date of Patent: Sep. 21, 1993

[54] AUTONOMOUS COMPUTER INPUT DEVICE AND MARKING INSTRUMENT

[76] Inventor: Mark Epperson, 6376A Buena Vista, Newark, Calif. 94560

[21] Appl. No.: 782,615

[22] Filed: Oct. 25, 1991

[51] Int. Cl.⁵ .............................................. G08C 21/00
[52] U.S. Cl. ........................................ 178/18; 178/87
[58] Field of Search .............................. 178/18, 19, 87

[56] References Cited

U.S. PATENT DOCUMENTS 4,751,741  6/1988  Mochinaga et al. ............... 178/18 X
4,777,329  10/1988  Mallicoat ............................. 178/18

*Primary Examiner*—Curtis Kuntz
*Assistant Examiner*—Paul Loomis

[57] ABSTRACT

An autonomous input device which enables the user to capture and store handwritten text and graphics in a precisely controllable manner for subsequent transmission to a computer in a computer readable format. This input device may look and feel like an ordinary writing pen and can function as a writing instrument while it captures that which is written with it. Further, this pen input device has the capability of sensing the absolute location of the pen tip, as opposed to other input devices such as computer mice, which sense relative locations only.

16 Claims, 4 Drawing Sheets

AUTONOMOUS COMPUTER INPUT DEVICE AND MARKING INSTRUMENT

FIELD OF INVENTION

This invention relates to input systems for computers, particularly with respect to mouse pointing devices, graphic digitizer tablets and keyboards for use in entering text and graphics data to computers in formats appropriate for processing and use thereof.

BACKGROUND OF THE INVENTION

A computer system typically includes an alphanumeric keyboard that enables users to enter commands and data in a text format for processing by the computer. Keyboards are the most commonly used form of input device for computers, but they require users to develop skills in typing, they are not well suited for entering graphics data, and they are usually tethered to the computer by means of a cable. Additionally, keyboards require users to learn many particular keystroke sequences to invoke corresponding computer commands, requiring more time to implement and more effort to learn.

Previously, a variety of additional input devices has been proposed and implemented for use with computers, to work as adjuncts to the common keyboard, or as an alternative for those applications in which the keyboard is not well suited. One input device in common use is the mouse pointing device, which obviates the need to learn keystroke sequences, as in the case of keyboards, and which is therefore more efficient for invoking particular computer commands. A mouse pointing device is primarily a cursor control system, consisting of a ball fitting within a handheld enclosure by which the ball is rotated in any direction within a fixed socket that is mounted within the enclosure. The ball-in-socket assembly is typically disposed towards a flat surface, such as a desktop or table such that it protrudes from the bottom of the handheld enclosure. A computer senses the direction and extent of movement, usually by means of wheels which rub against the ball in orthagonal directions. Each wheel is connected to a tachometer which indicates movement and direction of each such wheel. This is a relative device which cannot provide absolute position information. This device requires a mechanical connection between the positioning element and the measuring system. Further, this device is typically connected to the computer by means of an electrical cable and must be used in close proximity to the computer. This device functions satisfactorily for the purpose of initiating particular computer functions, but users regard the device as awkward and imprecise for purposes of entering text and graphics data.

Digitizer tablets perform well for entering graphics, and report absolute position well, but are impractical for entering textual data. Digitizer tablets involve the use of a flat pad which can be touched by a stylus. The pad senses the location of the touching object usually by resistance or capacitance disturbances in the field associated with the pad. A touch pad can also use acoustic surface waves.

Other input devices have been proposed, such as a tablet by which both graphics and textual data could be entered in a computer usable format using a stylus, however none of these other input devices have been widely adopted by users. These devices are typically tethered to the user's computer by an electrical cable, they typically provide no memory storage to permit autonomous usage, and further inconvenience the user owing to their physical dimensions.

Most users, therefore, would find it desirable to have a computer input device that is autonomous, i.e. untethered by cable connection to a computer, which permits easy and precisely controllable input of both text and graphics data, that fits in the hand like a pen or pencil for ease of use to ensure the foregoing capability, that affords a memory capacity to store the accumulated input of data of most users over the course of a day, and which can be carried unobtrusively in a user's shirt pocket.

SUMMARY OF THE PRESENT INVENTION

Accordingly, we claim the following as our objects and advantages of the invention: to provide a tool which enables precisely controllable entry of both text and graphics to a computer because it operates in the same manner as the familiar pen or pencil, can be carried unobtrusively in a user's shirt pocket, can store input data created in the course of a day for subsequent transmission to a computer, is capable of being untethered from a computer, and affords the same functional pointing capability of a mouse pointing device.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
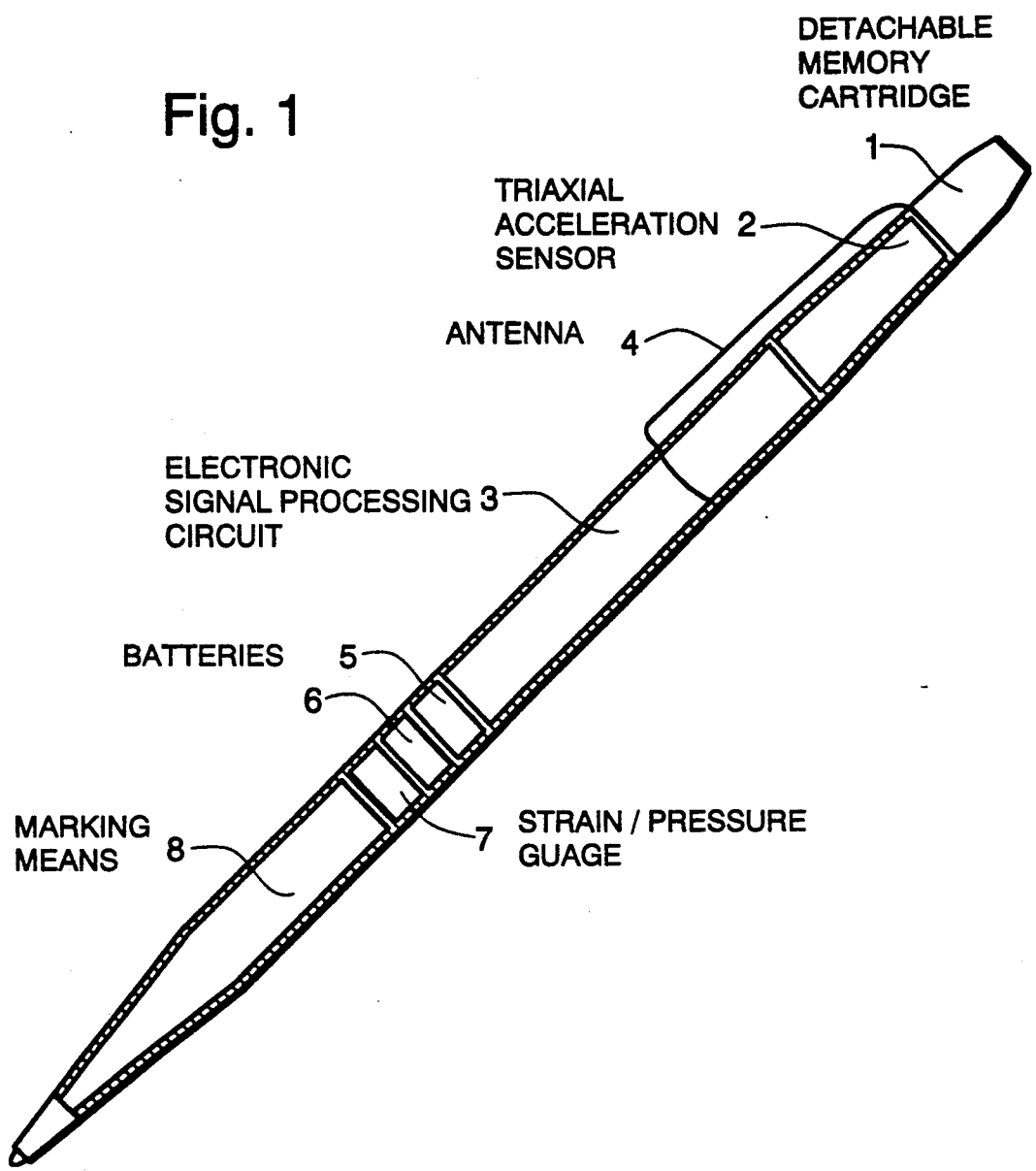
FIG. 1 is a cutaway view of one embodiment of the pen input device which is a major constituent component of this invention.

Thus, in FIG. 1 there is illustrated one embodiment of the autonomous pen input component of the invention in which detachable memory cartridge 1 comprises a module containing either battery backed-up static random access memory (RAM), or FLASH Erasable Programmable Read-only Memory (EPROM), or Ferro-Electric Random Access Memory (FRAM), a triaxial acceleration sensor assembly 2, electronics assembly 3 which includes the analog signal processing circuitry, a microcontroller, memory chip(s) which contains the software for determining pen location/position and for transmitting said data to the host computer, the antenna 4 for radio transmission of pen data to the host computer, batteries 5 and 6 which may be in the form of nickel metal hydride, zinc-air, lithium, nickel cadmium or alkaline, strain/pressure gauge 7 and marking means 8.

Figure 2:
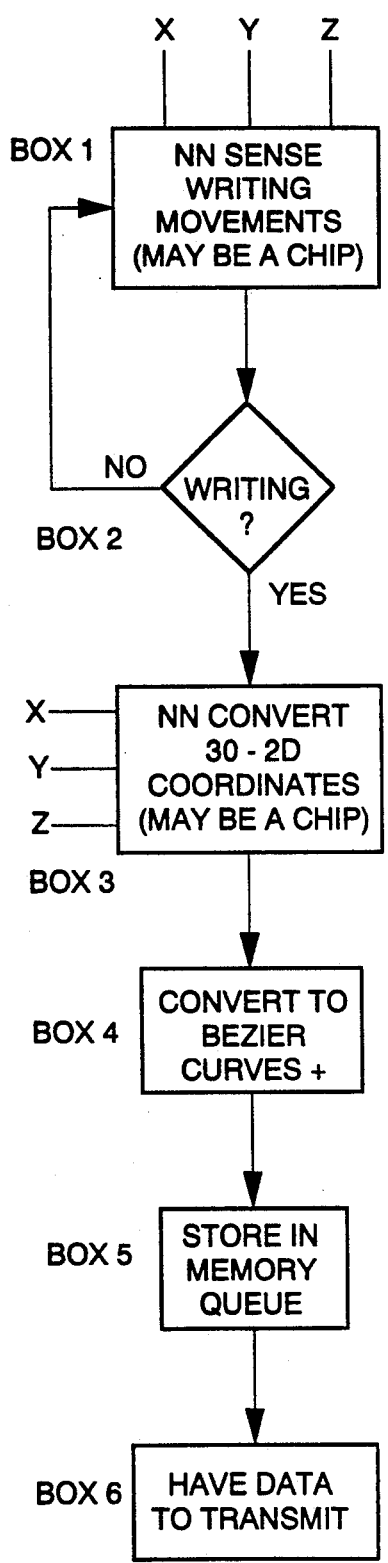
FIG. 2 is a flow chart diagram showing the flow of data from the point of entry to the pen input system, to the point of transmission to the receiving base station of this invention.
Figure 3:
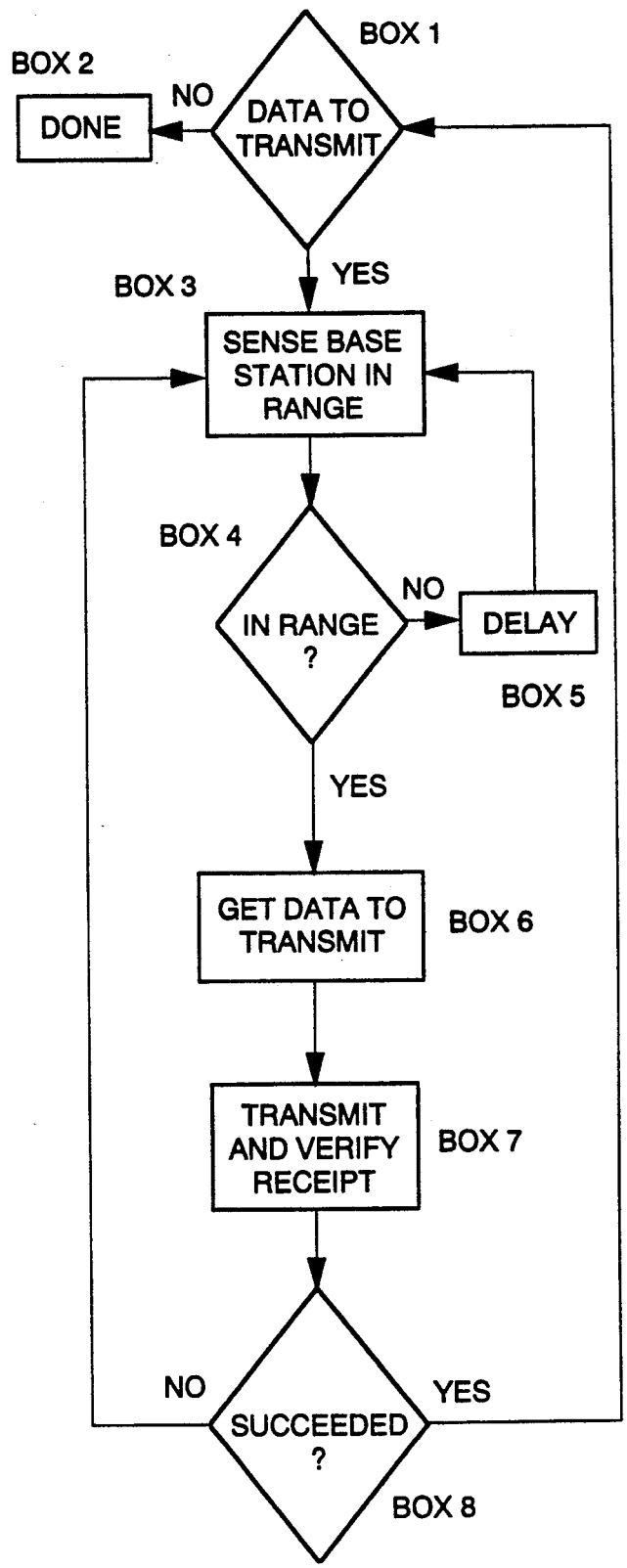
FIG. 3 is a flow chart diagram showing the flow of data from the receiving base station of this invention to the host computer.

FIGS. 2 and 3 represent the software running in the pen. The software represented in FIGS. 2 and 3 operate asynchronously. The software represented in FIG. 2 processes the signal coming from the acceleration sensors and stores the results in a memory queue. The software represented in FIG. 3 performs the task of communicating with the base station, which is attached to the host computer. The receiving base station shall be a small box shaped device enclosing a small printed circuit board containing radio frequency reception electronics and additionally circuitry as may be appropriate for transmission of data which it receives from the pen, to the host computer. The receiving base station shall be connected to said host computer by means of a cable, which cable shall connect to interface circuitry in the base computer. Said interface circuitry may be parallel, serial or some other interface standard. In the preferred embodiment, the receiving base station is no larger than a pack of cigarettes, with a shielded cable coming out of one end and running three to six feet to the back of the end-user's computer.

FIG. 2, Box 1, [NN Sense Writing Movements], continuously samples signals from the acceleration sensors and determines if said signals represent writing movements. This is accomplished by means of a neural net system, which can be implemented in either hardware or software, or both, and which has been trained to recognize such signals as writing movements, gestures, or other meaningful movements. In Box 2, if writing signals are detected, then, in Box 3, [NN Convert Coordinates], the X, Y, and Z signals are converted from three-dimensional to two-dimensional coordinate systems and the location of the tip of the pen is calculated, based on the previous location of the tip of the pen and the current XYZ sensor inputs. In the preferred embodiment, this location calculation is accomplished by means of a neural net system which has been trained to perform this calculation. The location calculation may also be performed by means of a nearest neighbor interpolation, or one of a number of other calculation methods available in the art. The resulting XYZ coordinates are passed on to Box 4, where they are converted to Bezier curves and are further compressed, using such techniques such as Run Length Limited (RLL) encoding, or Huffman encoding, among others. The compressed data is passed on to Box 5 where it is stored in a memory queue, and in Box 6 it is noted that new data is available for transmission.

In FIG. 3, Box 1, the memory queue is checked to determine if there is any data to transmit. If there is no data to transmit, control proceeds to Box 2, where, after a suitable delay, it proceeds to Box 1 and repeats itself. If there is data to transmit, it proceeds to Box 3, [Sense Base Station in Range], which checks the radio receiver in Box 4 to determine if the base station signal can be detected. If not, it will proceed to Box 5, where, after a suitable delay, it will return to Box 3 and try again. If there is data to transmit, it will proceed to Box 6, [Get Data to Transmit], where it will get the data from the memory queue, to be assembled into a packet format for transmission, whereupon it proceeds to Box 7, where the data will then be transmitted, and thereupon wait for verification of receipt. In Box 8, if the data was successfully received, it will return to Box 1. If not, then it will return to Box 3.

Figure 4:
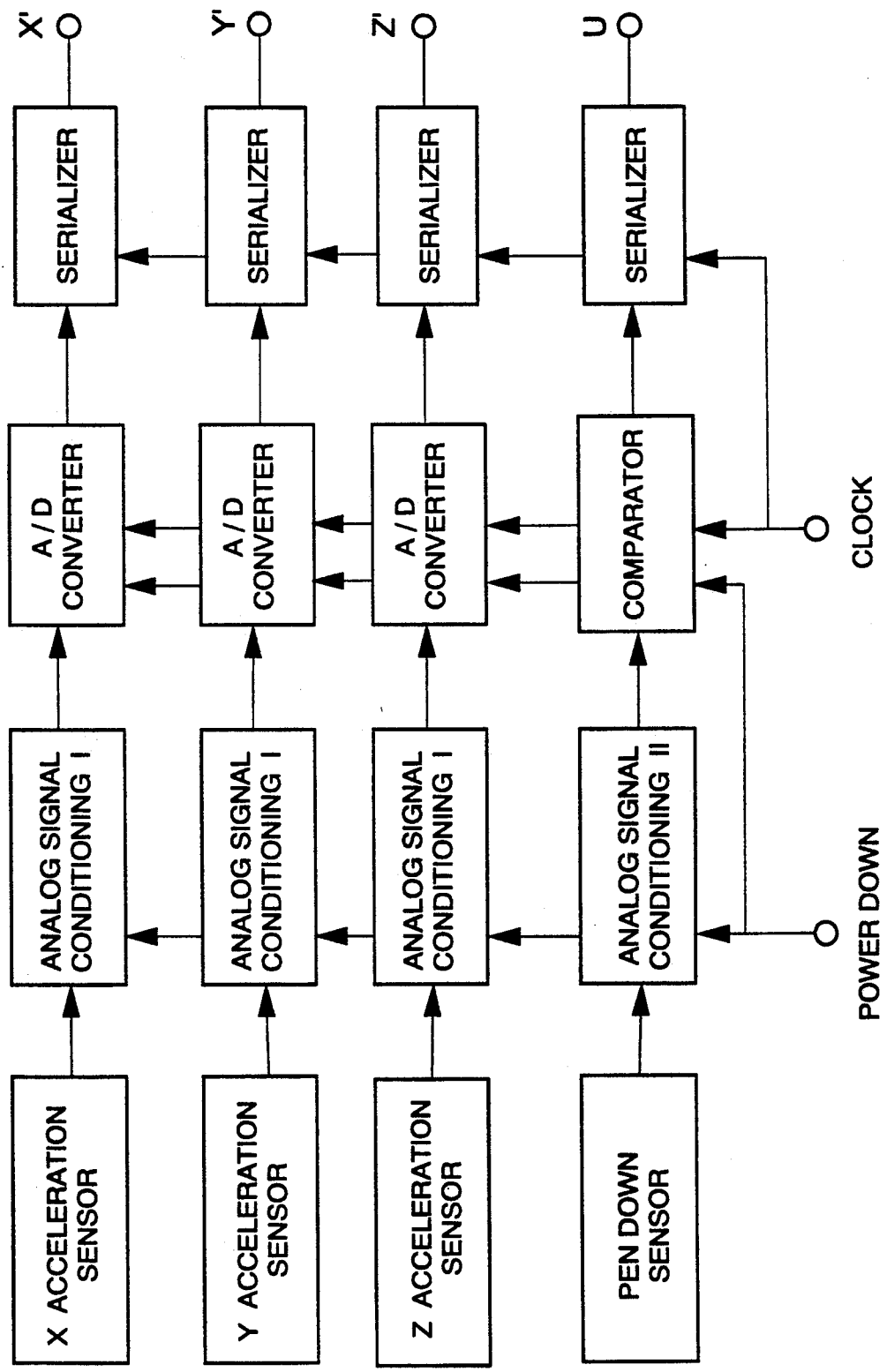
FIG. 4 is a block diagram showing the front-end electronic circuitry involved in receiving, amplifying and conditioning the pen input signals for subsequent processing by the primary processing electronics.

In FIG. 4, acceleration sensors are positioned at or near the back end of the pen input device to sense movement of the pen's back end in three dimensions. An additional sensor may be used specifically to determine if the writing end of the pen is touching the writing surface. The outputs from each of these three sensors are fed individually to the Analog Signal Conditioning circuitry, where they are amplified, noise attenuated and further appropriately conditioned for use by the A/D Converters. The A/D Converters will convert signals of useful strength to digital bit information. These signals may then be fed to the Serializers, if needed, which will convert parallel to serial signals. Subsequent design efforts will determine if the Serializer stage is necessary. If the fourth sensor, the Pen-Down Sensor, is employed, the output will be fed into a separate Analog Signal Conditioning circuit. This circuit, possibly of different design than the other three, will condition this special signal for use by the Comparator. The comparator will function in a similar fashion as the three other A/D Converters, except that it will convert only one bit of information at a time. This signal is then fed into the Serializer, if needed.

Figure 5:
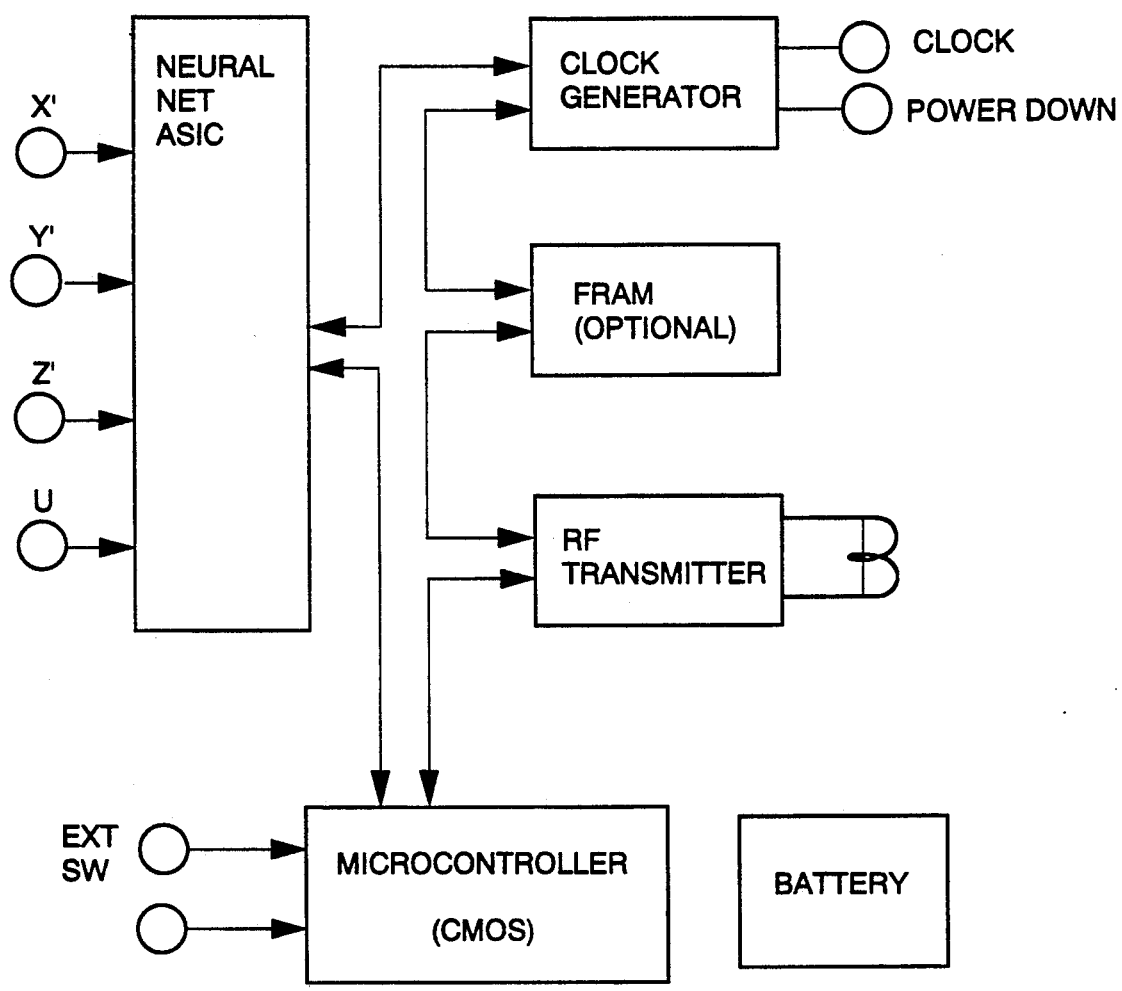
FIG. 5 is a block diagram showing the processing electronics for receiving the conditioned signals for subsequent transmission to the host computer through the receiving base station designed for that purpose.

These three or four signals are collectively fed into the Neural Net (FIG. 5). The Neural Net may be a hardware or software solution to signal processing, or a combination thereof. The Neural Net will be previously trained to recognize patterns and make conclusions about these patterns. It will determine if the input signals are relevant and, if so, whether they are user commands or actual writing. The output will consist of pen-tip position information and user commands and destination of the data will be determined by the Microcontroller. The Microcontroller will provide many necessary functions. It will signal the RF Transmitter to send regular interrogation signals and receive after each. Until it receives a reply from the base station, it will route the output of the Neural Net to FRAM. If it receives a reply, the Microcontroller will download the data already in FRAM (Ferrite Random Access Memory) to be transmitted, and output from the Neural Net will continue to go into FRAM awaiting its turn to be transmitted. If there is no data in memory, the Microcontroller will route the output of the Neural Net system directly to the RF Transmitter until no verification signal is received from the base station. The Microcontroller will also query the Clock Generator to determine if and for how long the pen is not being used to write. It will power down all circuitry unnecessary to its operation in this state. The Microcontroller will also receive user commands and determine appropriate action.

In the preferred embodiment, the autonomous input device will be comprised of two main components, a non-tethered stylus, or pen input apparatus, having the shape, function and overall appearance of a pen or pencil writing instrument, and a receiving base station, having the appearance of a small box of similar dimensions to a pack of common cigarettes and connected to a host computer by means of a cable. Attached at the end of the cable which enters the host computer will be a connector, appropriate for one of a multiplicity of interface standards. The pen input device first described may be comprised of the following subassemblies: (1) a writing pen enclosure of dimensions common to pen or pencil writing instruments, (2) an ink cartridge, including a spring and cartridge-out/cartridge-in mechanism common to writing instruments, (3) an electronics circuitry subassembly, comprised of one or a number of different computer chips installed on a printed circuit board, and (4) a battery subassembly. The electronic circuitry subassembly may be assembled in a multiplicity of different configurations. There may be one or several chips installed on a printed circuit board or the assembly may be constructed of a hybrid device that includes microcircuitry and chips connected by one or a number of different means commercially available and familiar to those practiced in the art of miniaturation of printed circuits and computer chip technology. In one embodiment of said electronics circuitry subassembly, a neuron processor chip and a microprocessor chip are fixed to a flexible circuit board, which is connected to an FRAM chip by an appropriate connector means. The microprocessor chip may contain RAM elements in addition to A/D and D/A circuitry. Thus, manufacture of the pen component of the invention described herein may be accomplished by means of assembling a multiplicity of subassemblies and components, the configuration of which may vary according to choices between customized and non-customized components which are commercially available from a number of different vendors of computer chips, printed circuit boards and micro-electronic circuitry systems.

From the standpoint of the user, the invention will be comprised of the two aforesaid components: (1) a stylus, or pen writing instrument, and (2) a base receiving station. The end-user will be able to utilize the pen for capturing text and graphics data, from virtually any distance from the host computer. The end-user may write on any flat surface, and what is written will be captured and stored in the pen. However, it should be noted that it is not essential that the end-user write on a flat surface. In another embodiment, the pen input device could capture strokes and gestures made in three dimensional space without the requirement of a flat surface. At some later point in time, the end-user may return within a certain proximity of the host computer and the data previously captured and stored in the pen input device will be transmitted automatically to the host computer for subsequent processing by said computer. In the preferred embodiment, the storage capacity of the pen input device is increased by means of a removable memory storage component, residing at the opposite end of the pen from the writing end. Upon receiving a signal from the pen that the memory storage means is nearly filled to its capacity, the end-user could replace said memory storage module by another of the same design.

While particular embodiments of the invention have been illustrated and described, it should be understood that many modifications and variations may be restorted to by those skilled in the art, and the scope of the invention is limited only by a just interpretation of the claims which follow.

What is claimed is:

1. An autonomous input device for a computer, comprising:
   (a) an independent stylus suitable for grasping with the fingers;
   (b) movement sensing means disposed on said independent stylus for sensing the magnitude and direction of movement of said independent stylus and for generating signals representative of sensed movement; and
   (c) processing means disposed on said independent stylus for processing said signals into a computer usable format to provide a computer traceable image of the movement of said independent stylus relative to a predetermined starting point.

2. The autonomous input device of claim 1, further including transmission means for transmitting said computer usable format processed signals.

3. The autonomous input device of claim 2, further including memory means for storing said computer usable format processed signals.

4. The autonomous input device of claim 2, further including a receiving base station wherein the transmission means further includes a connector means for hard wire connection of the base station to the computer.

5. The autonomous input device of claim 2 wherein the transmission means includes a radio transmitter for broadcasting the computer usable formatted signals for reception by the base station.

6. The autonomous input device of claim 2 wherein the transmission means includes a computer recognition means for recognizing when the base station is within broadcast range and for then automatically broadcasting the computer usable formatted signals for reception by the computer.

7. The autonomous input device of claim 2 further including a marking means disposed on the stylus for leaving a mark on a writing surface.

8. The autonomous input device of claim 7 wherein the marking means includes a pen tip and an ink reservoir disposed on the stylus.

9. The autonomous input device of claim 2 wherein the movement sensing means further includes first direction movement sensing means, second direction movement sensing means and third direction movement sensing means disposed on the stylus.
   said first movement sensing means disposed on said stylus in a first predetermined direction and generating a first signal representative of movement of said stylus in said first predetermined direction,
   said second movement sensing means disposed on said stylus in a second predetermined direction and generating a second signal representative of movement of said stylus in said second predetermined direction, and
   said third movement sensing means disposed on said stylus in a third predetermined direction and generating a third signal representative of movement of said stylus in said third predetermined direction.

10. The autonomous input device of claim 9 wherein said first, second and third movement sensing means are first, second and third accelerometers, respectively, and said first, second and third signals are electrical signals.

11. The autonomous device of claim 9 wherein said second predetermined direction is perpendicular to said first predetermined direction and said third predetermined direction is perpendicular to both said first and second predetermined directions.

12. The autonomous input device of claim 9 further including a marking means disposed on the stylus for leaving a mark on a writing surface.

13. The autonomous input device of claim 11 wherein said independent stylus has first and second ends and wherein the marking means and the first, second and third accelerometers are located at the same end.

14. The autonomous input device of claim 11 wherein the stylus has first and second opposite ends and wherein the marking means is located at the first end of the stylus and the first, second and third accelerometers are located on a portion of the stylus that ranges from 70% of the distance from the first end to the second end of the stylus.

15. The autonomous input device of claim 14 wherein the first, second and third accelerometers are located at the second end of the stylus.

16. The autonomous input device of claim 9 wherein the processing means includes a signal elimination means for eliminating one of the first, second or third signals to provide the reduction of spherical movement of the stylus to a planer computer traceable record of the movement of said independent stylus relative to a predetermined starting point.

* * * * *